Oct. 27, 1931.  C. G. OLSON  1,829,292
HOB CUTTER AND METHOD OF MAKING SAME
Filed May 3, 1929  2 Sheets-Sheet 1
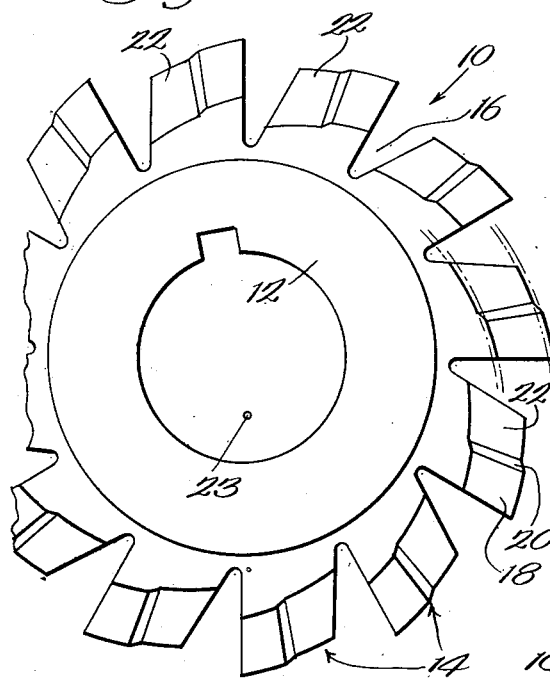
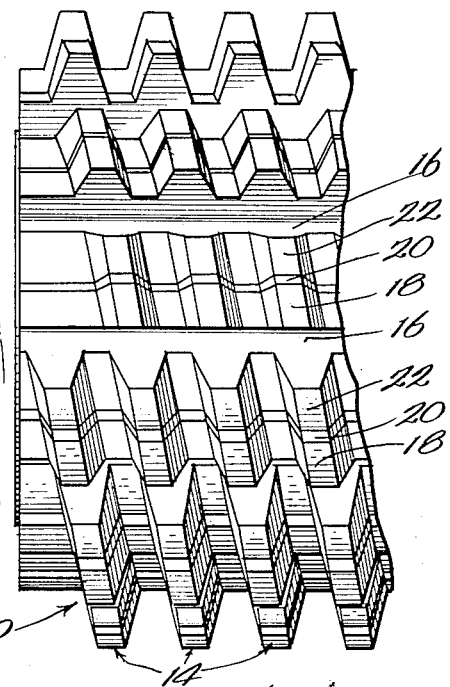
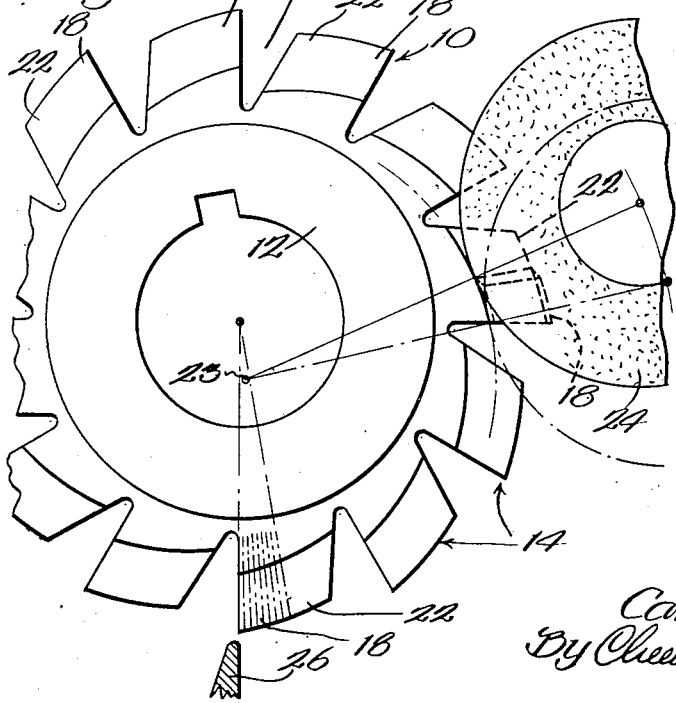
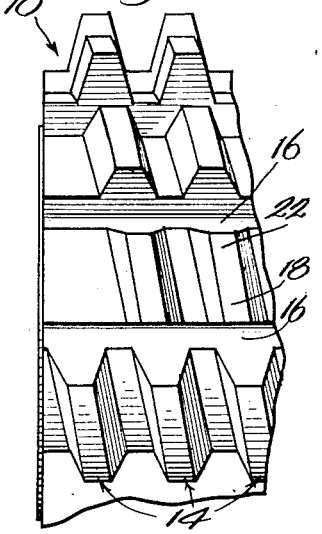
Inventor:
Carl G. Olson
By Cheever, Cox & Moore
Attys.

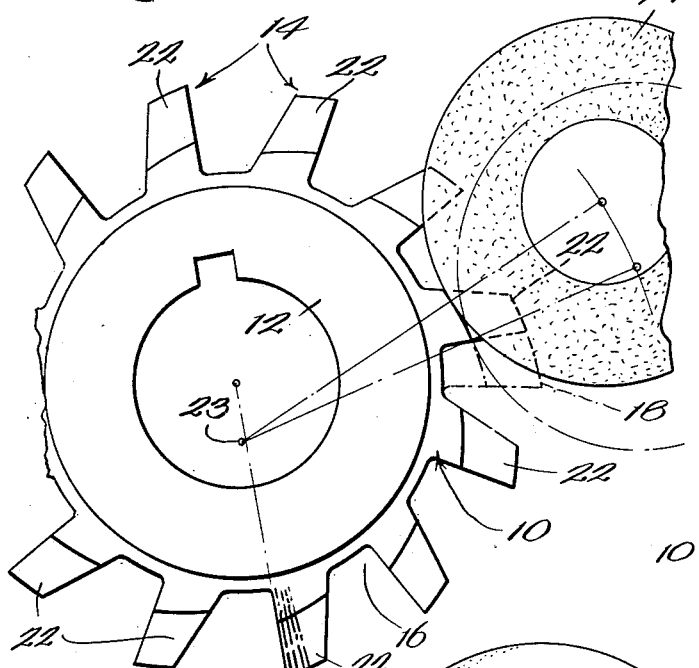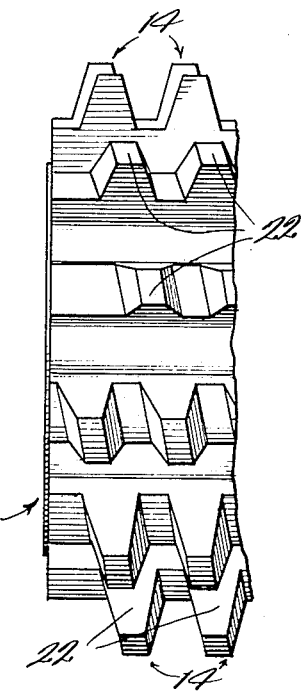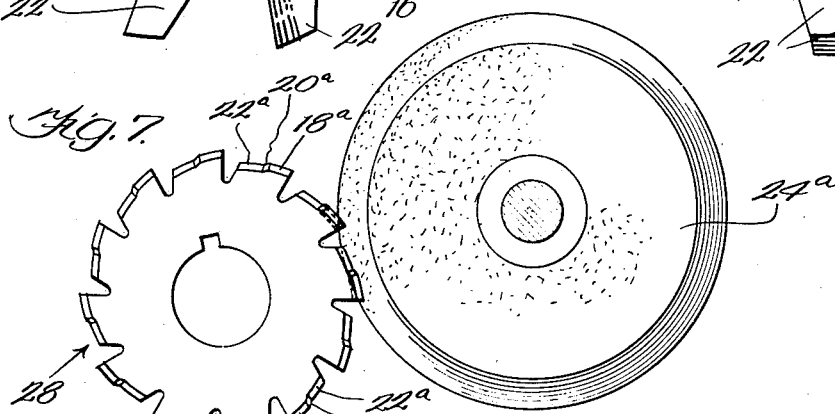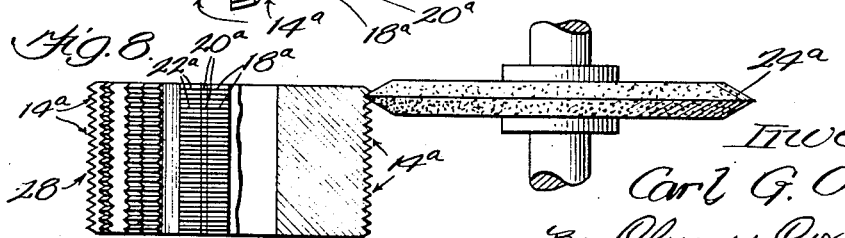

Patented Oct. 27, 1931

1,829,292

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

HOB CUTTER AND METHOD OF MAKING SAME

Application filed May 3, 1929. Serial No. 360,136.

My invention relates to rotary cutters having relieved teeth and to methods of making them, but more particularly to hobs and to methods of relieving the teeth thereof.

One of the primary objects of my present invention is to provide a hob which is so constructed that the surfaces of the teeth thereof may be ground by the use of a wheel of relatively large diameter and to this end I propose to preliminarily relieve the hob teeth so as to present a compound tooth construction.

More specifically it is an object of my present invention to provide a rotary cutter as set forth above in which the forward portion of each tooth may be initially ground without carrying the grinding wheel into contact with the rearward portion thereof, whereby grinding wheels of relatively large diameter may be employed without the necessity of increasing the width of the hob gashes.

Another object of my present invention is to provide a hob cutter having peripheral teeth which are relieved in such a manner as to make for longevity and to render the hob efficiently operable.

Still another object of my invention is to initially provide the cutter teeth with a compound relief of such a nature that the rearward portion as well as the forward portion of each tooth may be used for hobbing purposes and that said rearward portion will serve also to lend strength and rigidity to the forward portion.

To accomplish these and other objects I propose to practice a tooth relieving method whereby a compound movement is imparted to the relief cutting tool so as to produce forward and rearward relieved tooth portions which are both eccentrically relieved, and then grind the surface of the forward portions of the teeth until said forward portions merge or blend with the rearward portions.

These and numerous other objects will be more apparent from the following detailed description when considered in connection with the accompanying drawings, wherein:

Figure 1 is an end elevational view of a rotary cutter or hob which is representative of one embodiment of my invention;

Figure 2 is a fragmentary elevational view of the cutter as viewed from the right of Figure 1;

Figure 3 is an end elevational view similar to Figure 1 disclosing the hob after the forward portions of the teeth have been ground by means of the grinding wheel which is disclosed in association therewith;

Figure 4 is a fragmentary elevational view of the hob as viewed from the right of Figure 3;

Figure 5 is an end elevational view of the hob after the forward portions or sections of each of the teeth have been ground away as the result of sharpening, said view disclosing the manner in which the grinding wheel may then be applied to that portion of each tooth which originally was the rearward and supporting portion;

Figure 6 is a fragmentary elevational view as viewed from the right of Figure 5;

Figure 7 is an end elevational view of a thread milling hob constructed in accordance with the teachings of my present invention, the same being shown in association with a grinding wheel for the purpose of illustrating the relatively large grinding wheel which may be employed for grinding cutters which have been relieved in accordance with my present invention; and Figure 8 is a plan view of the elements disclosed in Figure 7, a portion of the cutter being broken away to more clearly set forth the invention.

Referring now to the drawings more in detail wherein like numerals have been employed to designate similar parts throughout the various figures, it will be observed that one form of rotary cutting tool which characterizes my present invention is the generating hob disclosed in Figures 1 to 6 inclusive which I have designated generally by the numeral 10. This hob comprises a cylindrical body portion 12 which is formed with a plurality of peripheral teeth 14. In preliminarily forming these teeth 14, it is common practice to first form a helix and subsequently mill the transverse gashes 16. After these gashes 16 have been formed, the teeth are ready to be relieved and my present invention relates particularly to an improved method of relieving these teeth.

Referring particularly to Figures 1 and 2, it will be observed that the forward portion or section of each tooth is designated by the numeral 18, the medial portion of each tooth by the numeral 20 and the rearward section by the numeral 22. The relief formed in these teeth 14 is of a compound nature. In other words, when the forming or relieving tool is applied to a tooth, said tool is first moved along a path embraced by the forward tooth section 18 and when said tool reaches the medial portion of the tooth, a forward movement is imparted to the tool so as to present the mid-section 20. From this point the tool is moved along a path embraced by the rearward tooth section 22, which path has the same degree of eccentricity as that embraced by the forward tooth section 18, as shown by the dot and dash lines in Figure 1. Thus, it might be stated that in practicing my improved method of relieving the hob teeth, an ordinary degree of relief is applied to the forward section 18, a greater relief at the intermediate portion 20 and then the ordinary degree of relief is again applied to the rearward portion. The center about which the relieving tool (not shown) moves is indicated by the numeral 23.

After the hob teeth have been relieved in the manner just described, a grinding wheel 24 is applied so as to grind the forward portion or section 18 of each tooth, said wheel being moved about the eccentric axis 23. This grinding wheel may be applied to said forward tooth portions without engaging the rearward portions. Hence, the grinding wheel 24 may be of considerably greater diameter than the wheel which would be employed if the entire peripheral surface of the teeth were to be ground. Stock is removed from the forward portions 18 of the teeth by said grinding wheel until the surfaces of said forward portions blend or merge with the unground surface portions of the rearward tooth sections 22. After the forward ground sections of the tooth merge with the unground rearward sections 22, the hob teeth will assume the conventional form disclosed in Figure 3. That is to say, the ground front part of each tooth and the unground rear part of each tooth will have the same final relief. The advantage of having the rearward portions 22 relieved with the same degree of eccentricity as the forward portions 18 will be more apparent when the sharpening operation of the hob teeth is considered.

In sharpening hob teeth it is customary to employ a grinding wheel 26 shown fragmentarily in Figure 3, which grinding wheel engages the front faces of the hob teeth. Obviously, each sharpening stroke past the wheel 26 removes stock from the face of the teeth. The rearward section 22 of each tooth lends considerable rigidity and support for the forward ground portion 18. The portions of the teeth removed by grinding are indicated by the radial dot and dash lines shown in Figure 3 and when the faces of the teeth have been ground back so as to remove all the stock included within the section designated by these dot and dash lines, the unground portions 22 of the teeth will be reached. If it is deemed desirable, these portions 22 may now be ground in the manner disclosed in Figure 5. Obviously, the sections 22 of the teeth not only serve as a support and strengthening medium for the companion forward portions, but may also be used for actual hobbing purposes. While obviously, the strength of the hob teeth is reduced after the same have assumed the size disclosed in Figure 5, said teeth have sufficient strength to be used for certain practical purposes. It will thus be apparent that by practicing my improved method of tooth relieving, so as to provide the forward and rearward tooth sections with different relief characteristics having the same degree of eccentricity, the utility of the hob is materially increased by reason of the fact that the rearward supporting sections 22 may be used for actual gear cutting purposes.

My invention is particularly adaptable in forming the relief on hob milling cutters of the type disclosed in Figures 7 and 8, said cutter being indicated generally by the numeral 28. A thread milling cutter is representative of one of those types of cutters which require the teeth to be ground with comparatively large grinding wheels in order to obtain sharp tooth corners. The usual method of making thread milling cutters is to provide the cutter with exceptionally wide flutes in order to make room for the grinding wheel to run out at the rear end of the teeth without striking the cutting edges of the following row of teeth. This makes the hob teeth comparatively short and hence the usable portion of the teeth is still shorter in view of the fact that the rear portion of each tooth must be left for supporting the cutting edge. By practicing my improved method, the hob 28 is provided with a plurality of peripheral teeth 14—a which are formed with a compound relief similar to that just described in connection with the hob 10. Thus the teeth 14—a are initially relieved so as to present a forward portion or section 18—a having the usual degree of relief, a medial section 20—a of greater relief and a rearward section 22—a which is of the same degree of eccentricity as the forward portion 18—a. It will thus be apparent that after the teeth 14—a have been initially formed with the above mentioned relief, a grinding wheel 24—a may be employed to grind away the forward tooth portions 18—a in the manner described in connection with the grinding of the forward portions 18 of the hob teeth 14. It will also be apparent that a grinding wheel of relatively large diameter may be employed without the necessity of increasing the size of the hob gashes. After the teeth in the cutter 28 have been repeatedly sharpened so as to grind away the entire forward portions of the teeth, the rearward portion still remains and this rearward portion may be put into actual service for hobbing operations. If it is desired, this remaining rearward portion may also be ground by use of the grinding wheel 24—a.

From the foregoing it will be apparent that my invention contemplates the provision of a hob having improved structural tooth characteristics and said invention also contemplates the provision of an improved simple method of relieving teeth in hobs or rotary cutters of like nature which will increase the longevity of the cutter. In other words, the entire structure of each tooth in the cutter may be employed for actual cutting purposes. That is to say, the rearward as well as the forward portions of each tooth may be used for hobbing purposes and not only as a means for lending rigidity to the forward tooth portions. By practicing the described method of tooth relieving, the degrees of eccentricity in the forward and rearward portions of the teeth are the same and hence the true profile of the entire tooth structure is maintained.

While I have described my invention in connection with particular types of rotary cutters, namely, specific forms of hobs, it is to be understood that the invention is capable of application to many other forms of rotary cutters having relieved teeth.

Having thus described my invention, what I claim as new and desire to secure by Letters Patent is:

1. In a rotary cutter of the class described, a body portion, and a plurality of relieved cutting teeth thereon, the forward peripheral surface of each tooth being ground and the rearward portion of each tooth being unground, said unground rearward portion having the same degree of eccentricity as the forward ground portion, the thickness of the ground portion being greater than the thickness of the unground portion.

2. In a rotary cutter of the class described, a body portion, and a plurality of relieved teeth provided thereon, said teeth having a forward peripheral ground portion and a rearward peripheral unground portion, the thickness of the ground portion being greater than the thickness of the unground portion, said rearward unground portion having the same degree of eccentricity as the forward ground portion and being of such a size as to lend rigidity to the forward ground portion.

3. In a rotary cutter of the class described, a body portion, and a plurality of relieved cutting teeth thereon, the forward peripheral surface of each tooth being provided with a relief of a given eccentricity, the medial portion having a greater relief than said forward portion and the rearward portion having a relief which is less than the medial portion, whereby said forward peripheral portion may be conveniently ground.

4. In a rotary cutter of the class described, a body portion, and a plurality of relieved teeth provided thereon, said teeth having a forward peripheral portion having a given eccentricity, a medial portion having a different eccentricity and a rearward portion having the same eccentricity as the forward portion, whereby said forward portion may be conveniently ground, the forward portion being larger than the rearward portion.

5. In a rotary cutter of the class described, a body portion, and a plurality of relieved cutting teeth provided thereon positioned between transverse flutes, the forward peripheral surface of each tooth having a given eccentricity and the rearward peripheral surface of each of said teeth having the same degree of eccentricity but positioned with respect to the forward peripheral surface so as to permit said forward peripheral surfaces of the teeth to be ground without grinding said rearward tooth surfaces.

6. The method of relieving cutter teeth which consists in rotating the cutter, applying a cutting tool to the teeth and causing relative movement between the cutter and the tool so as to cause the forward peripheral portions of a tooth to be relieved with a given degree of eccentricity, radially shifting the relative positions of the cutter and tool and then imparting a relief to the rearward portion of the tooth which has substantially the same degree of eccentricity as the relief imparted to the forward portion of the tooth.

7. The method of relieving cutter teeth which consists in rotating the cutter, applying a forming tool to the peripheral surfaces of the cutter teeth, imparting relative movement between the tool and the cutter so as to relieve the forward portion of a cutter tooth with a given degree of eccentricity, imparting an increase in relief to the medial portion of said tooth and then relieving the rearward portion thereof with the same degree of eccentricity as the forward portion.

8. The method of relieving cutter teeth which consists in rotating the cutter, applying a forming tool to the peripheral surfaces of the cutter teeth, imparting relative movement between the tool and the cutter so as to relieve the forward portion of a cutter tooth with a given degree of eccentricity, imparting an increase in relief to the medial portion of said tooth, imparting a relief to the rearward portion of the tooth, and then grinding the forward peripheral surface of the tooth until said surface blends with the rearward surface.

9. The method of relieving cutter teeth which consists in rotating the cutter, applying a forming tool to the peripheral surfaces of the cutter teeth, imparting relative movement between the tool and the cutter so as to relieve the forward portion of the cutter teeth with a given degree of eccentricity, imparting a relief to the rearward portion of the tooth which is of substantially the same eccentricity as the forward portion but which is radially shifted with respect to said forward surface, and then grinding the forward peripheral surface of each tooth until said surface blends with the rearward unground portion.

10. In a rotary cutter of the class described, a body portion, and a plurality of relieved cutting teeth thereon, the forward peripheral relieved surfaces of each tooth constituting the largest diameter range and ground on the sides to present a true involute helicoidal surface, succeeding diameter ranges of each tooth being unground, said unground portions having the same degree of eccentricity as the forward peripheral surfaces.

In witness whereof, I have hereunto subscribed my name.

CARL G. OLSON.